Aug. 8, 1950  M. MALKI ET AL  2,518,039
FLASHLIGHT FOR RECHARGEABLE BATTERIES
Filed Nov. 22, 1946  3 Sheets-Sheet 1
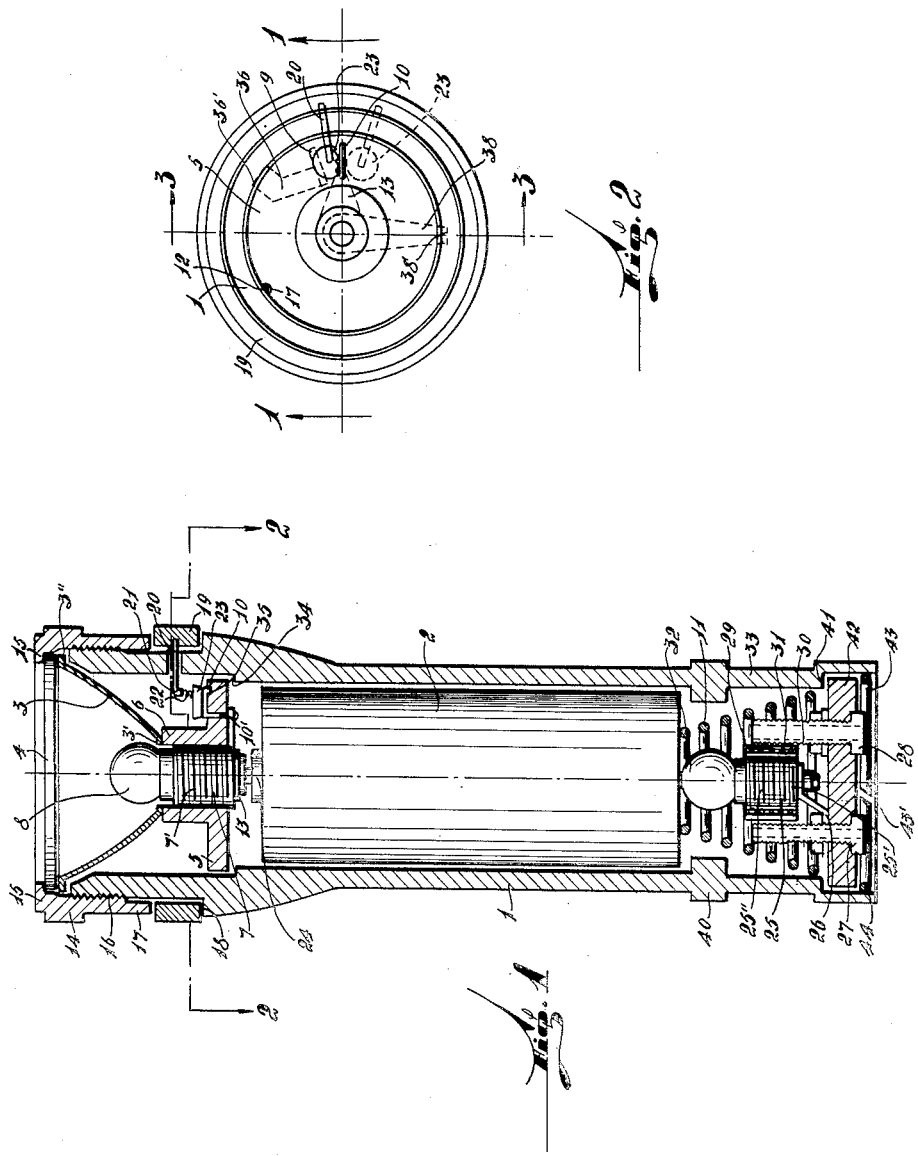
INVENTORS
MOISES MALKI, BORIS MATZKIN & ARON GOLDMAN
BY
Young Emuy & Thompson
ATTORNEYS

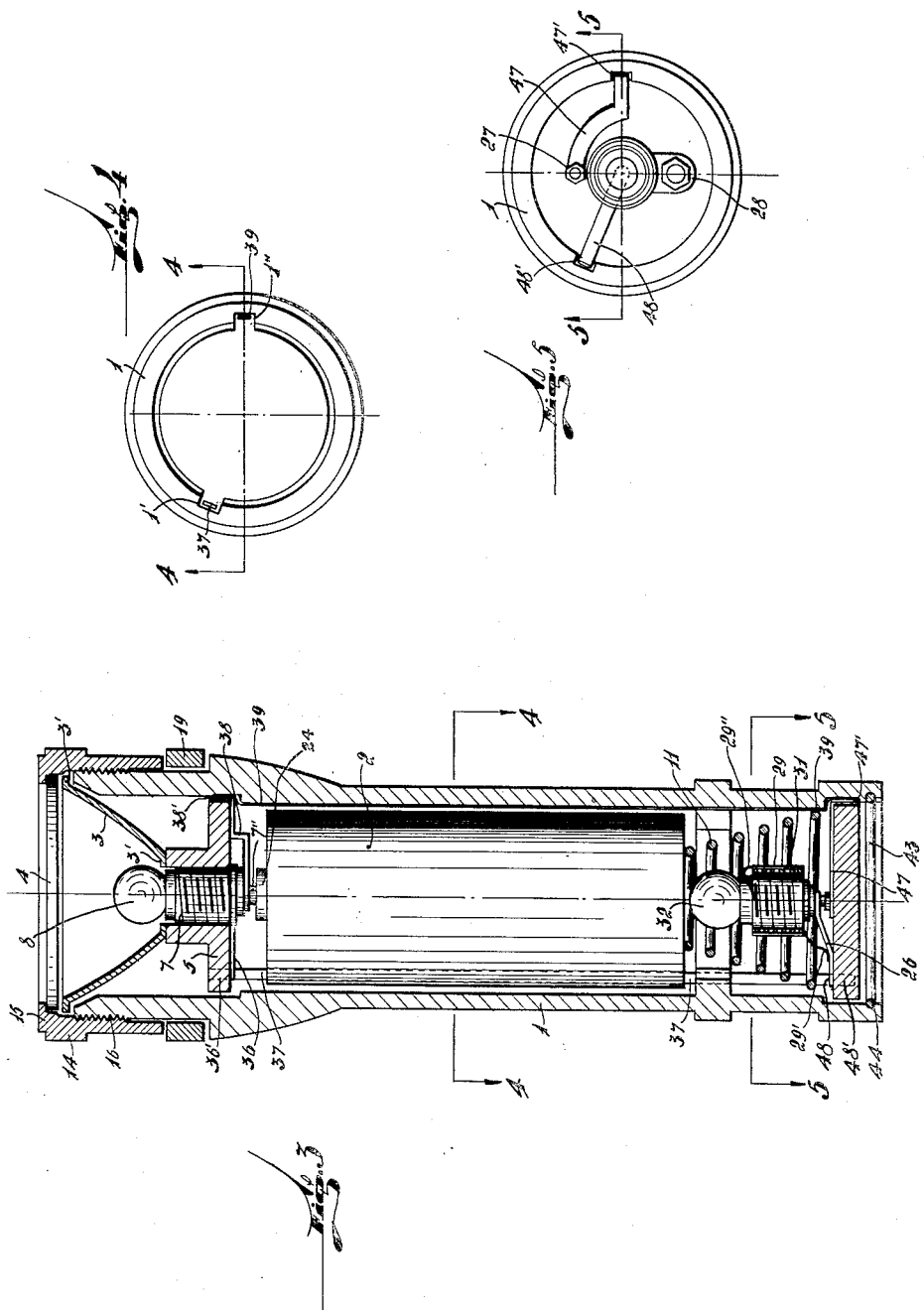

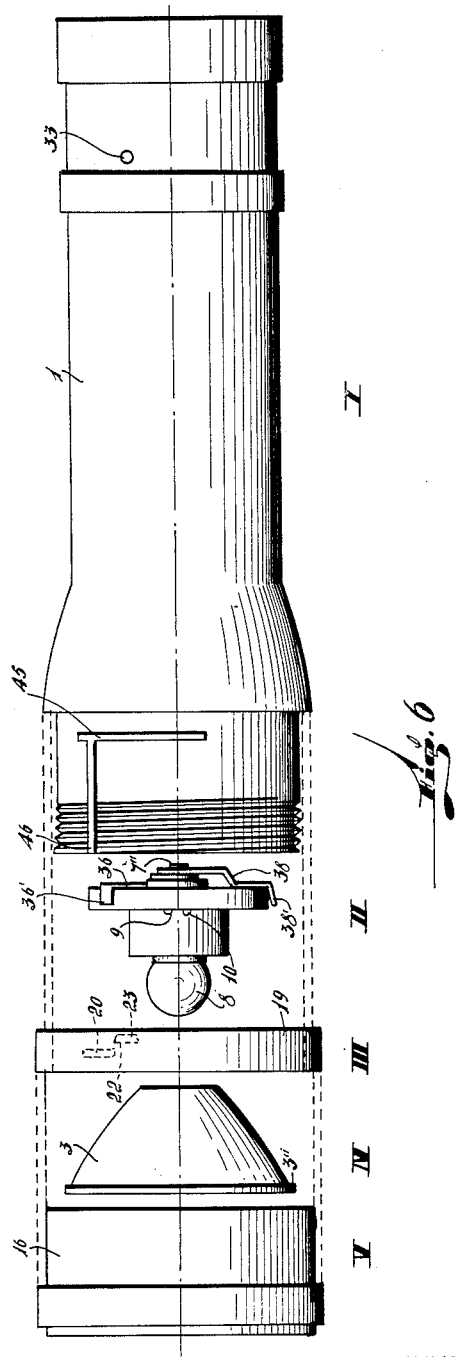

Patented Aug. 8, 1950

2,518,039

UNITED STATES PATENT OFFICE 2,518,039

FLASHLIGHT FOR RECHARGEABLE BATTERIES

Moises Malki, Boris Matzkin, and Aron Luis Goldman, Buenos Aires, Argentina

Application November 22, 1946, Serial No. 711,734
In Uruguay July 25, 1946

2 Claims. (Cl. 240—10.6)

This invention relates to flashlights, and more particularly to flashlights adapted to be used in conjunction with small size storage batteries.

In practice, the use of rechargeable secondary cells, that actually are small size electric accumulators, in flashlights, creates a number of practical requirements, not found in ordinary dry cell flashlights. This is not due to any externally different construction in the rechargeable cells, nor to any particular behaviour during discharge, since the characteristics of the small batteries are always adapted to the requirements of the flashlight. It is the recharging of the cell that involves an entirely new problem, which has to be solved in order to obtain a satisfactory service from the flashlight.

In general, the rechargeable batteries used in conjunction with flashlights are removed from the flashlight and placed in a charging device to effect their recharging. This involves the use of a spare battery, if the service cannot be discontinued, and the necessity of buying an expensive charging set, or else the trouble of sending the discharged battery to a shop equipped with the necessary apparatus.

From a consideration of these and other related factors, it may be concluded that a complete solution of the above mentioned drawbacks will be achieved if the flashlight itself provides for the recharging of its own storage battery, directly and without necessitating the removal of the cells from the flashlight, or resorting to the use of devices or instruments, the operation of which, is difficult for the layman.

Broadly speaking, the flashlight according to this invention includes, in addition to the control switch adapted to operate between the battery and the light projecting lamp, input means for the current from an external battery charging source, arranged on the flashlight body and accessible from outside, said current input means being electrically related with current limiting means, also adapted on the flashlight body and adapted to control the amount of current supplied to the battery within the limits established by the battery charging rate.

One of the principal objects of this invention is, therefore, to provide a flashlight for a rechargeable battery, which is adapted to effect the recharging of the battery without removing it from the flashlight, that is, keeping the battery in its normal operating position.

Another important object of this invention is to provide a flashlight having the characteristics of the preceding paragraph and being so simple in operation, as to make the process of recharging the battery very easy to perform even for persons completely lacking any technical knowledge.

Still another object of the invention is to provide a flashlight of the type mentioned, in which the battery charging means are simple, easy to assemble, and consequently, economical.

A further object of this invention is to provide, in connection with the charging means, a luminous signal adapted to serve as a battery charging signal.

Another object is to provide a flashlight provided with safety means adapted to the battery charging means and arranged to prevent a possible inversion of polarity between the battery and its charging current source.

Still another object of this invention is to provide a flashlight that, in addition to the above mentioned advantages, has an external shape and dimensions which do not detract from the practical advantages which should pertain to such a handy device as a flashlight.

Other objects and advantages of the invention will become apparent to those skilled in the art, from the following description taken in conjunction with the accompanying drawings illustrating a preferred embodiment of the invention, and wherein:

Fig. 1 is a longitudinal section of a flashlight embodying this invention, on the line 1—1 of Fig. 2.

Fig. 2 is a cross section of the flashlight illustrated in Fig. 1, on the line 2—2 of Fig. 1.

Fig. 3 is a longitudinal section of the same embodiment illustrated in the two previous figures, on the line 3—3 of Fig. 2.

Fig. 4 is a cross section of the same embodiment of the invention, on the line 4—4 of Fig. 3.

Fig. 5 is a cross section of the flashlight illustrated in Figs. 1 to 4, on the line 5—5 of Fig. 3.

Fig. 6 is a lateral elevation of the same flashlight, unassembled.

The same reference characters are used to indicate like or corresponding parts or elements throughout the drawings.

Referring now to the drawings, the flashlight includes a tubular body 1 adapted to house the secondary cell, or small size storage battery 2 in a battery compartment. The front part of the tubular body, wherein is located a light projecting assembly compartment housing such an assembly, has a gradually expanding external shape, corresponding internally to an increase of diameter at a shoulder 34 on which lies the insulating disc 5. This disc 5 has in its center a cylindrical hollow body 6 in which is housed a socket 7 for the light projection lamp 8. The cylindrical body 7 faces forward, and is retained at its front face against the smaller base of the reflector 3, this base being provided with a retaining rim 3' to this end.

In its front and larger base, the reflector 3 has a second rim 3" which is pressed between the front edge of the flashlight body and a sheet or cover 4 made of glass, transparent plastic material, or other light transmitting substance. The flashlight body is provided at its front end with an external thread 16 to which is threaded a front cover or cap 14 provided with an annular shoulder or rim 15 facing inwardly and adapted to press against the transparent sheet 4, which in turn retains the reflector 3, as explained above. Thus, it is seen that the pressure exerted by the cap 14 is used to retain firmly in position both the reflector 3 and the insulating disc 5.

The cap 14 extends externally and rearwardly towards the external shoulder 18 of the flashlight body, leaving a gap in which is housed the control ring 19, which serves for a purpose that will be explained below.

In the upper face of the disc 5 are arranged two contact elements 9 and 10 formed by relatively thick wires bent in the form of an U of unequal arms, one of which extends through the insulating disc 5 to contact the connecting strips arranged in the lower face of said disc, while the other is much shorter and extends only a few millimeters into the disc 5, which is provided for this purpose with a cavity 35 (Fig. 1).

The contact element 10 is connected at its longest arm 10' with a conductive strip 13 which is connected in turn to the threaded sleeve 7' of the socket 7. The other contact element 9 is spaced a short distance from the contact element 10, and is connected through its long arm, which passes through the disc 5 with a conductive strip which is located on the inner face of said disc and which is bent upwards at 36', so that when the disc 5 is in its correct position, bearing against the shoulder 34, the bent resilient end 36' of the strip 36, engages under spring pressure with a longitudinal metallic strip 37 housed in a suitable longitudinal groove 1' machined in the flashlight body 1 (see Fig. 4). The central contact piece 7" of the lamp socket 7 bears directly against the central positive front terminal 24 of the cell 2, said cell being pushed forward by the contact and pressure spring 11, which will be referred to in detail below. Said central contact 7" of the lamp socket 7 is also electrically connected to a conductive strip 38, which, similarly to the strip 36, has one end bent and resiliently pressed against the end of the metallic strip 39 that runs lengthwise of the flashlight body, into an appropriate groove 1".

The electrical operative connection between the contact elements 9 and 10, which closes the circuit of the cell 2 and the light projecting lamp 8, is obtained by means of a connecting bridge 23. The lower face of this bridge, and the cooperating surfaces of contact elements 9 and 10, may be plated with silver or other slightly oxidizable metal, adapted to provide low contact resistance. The connecting bridge 23 is supported by means of a helical spring 22 from a pin 20 which is bent at 21. This pin is supported at the end opposite to that supporting the spring 22, in a control ring of insulating material, which projects around the flashlight body. The pin 20 passes through the flashlight body through a slot 45 (Fig. 6) adapted to enable the pin to effect the angular displacement required to shift from the position shown in solid lines in Fig. 2, in which the bridge 23 joins the contact elements 9 and 10, to the position shown in broken lines in Fig. 2, in which position there is no electrical connection between the contact elements 9 and 10, and vice versa.

Since the bridge supporting pin 20 is fixedly attached to the control ring 19, the necessity of providing an assembly system adapted to permit of the easy introduction of the pin into the slot 45 is apparent. Fig. 6 gives a clear illustration of such a system as used in the present embodiment of the invention, since in that figure the flashlight appears with its front portion unassembled. The parts have been indicated with Roman numbers from I to V, as follows: I indicates the flashlight body 1 in conjunction with the battery 2 and all the elements of the rear part of the flashlight; II is the disc assembly, comprising the disc proper 5, the contact elements 9 and 10 and the lamp socket 7; III is the control ring 19, together with pin 20, spring 22 and the connecting bridge 23; IV is the reflector 3; and V is the front cap 14.

To assemble the flashlight it is necessary to first place the disc assembly II into the body I, being careful to place the resilient ends 36' and 38' of the conductive strips 36 and 38 respectively in engagement with the metallic strips 37 and 39, which operation is facilitated by providing the flashlight body 1 with a guide member 12 adapted to engage a notch 17 of the disc 5. Furthermore, the guide member 12 and notch 17 serve to prevent the disc 5 from rotating when the switch formed by the elements 9, 10 and 23 is operated.

Once the assembly II is correctly placed, the control ring assembly III is located in place, to which end the pin 20 is inserted into the longitudinal slot 46 and pushed down as far as the operating slot 45. Then, the reflector IV and the assembly V, comprising the cap 14 and the transparent sheet 4, can be correctly placed.

The rear part of the flashlight body has a circumferential inner shoulder 40 for preventing a possible rearward movement of the battery 2, and the consequent fracture of the charge indicating lamp 32. The longitudinal conductive strips 37 and 39 pass through appropriate notches, not illustrated, in the shoulder 40.

At its rear end, wherein is located a current input and limiting assembly compartment housing such an assembly, the flashlight body is provided with a shoulder 41 on which rests a socket supporting disc or closure cap 42, retained by a resilient metallic ring 43 which fits into a circumferential groove 44 machined in the inner surface of the flashlight body 1. This ring 43, is interrupted at 43', so that it may be removed by reducing its diameter with the aid of an appropriate tool introduced between the groove 44 and the ring 43. It will then be possible to remove the socket supporting ring 42.

To the socket supporting disc 42 is fixed, in any suitable manner, a conducting strip 48. The end 48' of this strip engages under resilient pressure with the metallic strip 37, electrically connected to the conducting strip 36, which is connected in turn to the contact element 9 of the light projecting lamp switch assembly. The strip 48 is connected to the central contact 25" of the socket 25 of the charging current indicating lamp 32. The conductive strip 36 is also soldered to the helical contact spring 11 and to the end 29' of the wire 29.

The conductive strip 39 is connected at its rear end to the spring end 47' of the conductive strip 47, connected directly to the charging current input terminal 28. The other charging current terminal 27 is connected through a conductive strip 26 to the external threaded sleeve of the lamp socket 25 of the charging current flow indicating lamp 32.

In electrical shunt with the charging current indicating lamp 32 is connected a resistor comprising a covered wire 29 of high specific resistivity, which is coiled around an insulator tube 30 that surrounds the lamp socket 25. The winding is protected by a second external insulator tube 31. One end 29' of the wire 29 is soldered, as above mentioned, to the conductive strip 36, the other end 29" of the wire being connected directly, by soldering, to the external threaded sleeve of the lamp socket 25.

To prevent any possibility of inversion of polarity, during charging, which would very likely ruin the battery 2, the terminals 27 and 28 are one pole sockets of different diameters.

At the rear part of the flashlight body there is a hole 33 through which the light of the filament of lamp 32 is seen. The lighting of this filament is, in fact, an indication of the charging current flow.

To use the flashlight as a source of light, the control ring 19 should be rotated until the connecting bridge 23 joins the contact elements 9 and 10, so that the circuit of the battery 2 and light projection lamp 8 is closed.

The battery 2 is charged by connecting the terminals 27 and 28 with the terminals of a direct current source of appropriate voltage. This source may be a motor car storage battery. For a given voltage, the charging current will be regulated by the electrical characteristics of the lamp 32 and the resistor 29. The correct value of this charging current is, of course, determined by the particular characteristic of the battery 2.

We claim:

1. A flashlight for a rechargeable battery, comprising a rechargeable battery, a light projecting electric lamp assembly, a charging current input assembly, a three-shouldered compartmentalized casing having a light projecting assembly compartment, a battery compartment, and a charging current input assembly compartment, an insulating disc supporting said light projecting assembly, an insulating cap supporting said charging current input and limiting assembly, and a light transmitting cover, said insulating disc engaging a first shoulder of said casing to define along with said cover the light projecting assembly compartment, one end of said battery engaging a second shoulder of said casing defining along with said disc the battery compartment, and said cap engaging a third shoulder of said casing defining along with the shoulder engaging end of said battery the current input assembly compartment.

2. A flashlight for a rechargeable battery, comprising a rechargeable battery, a light projecting electric lamp assembly, a charging current input assembly, a compartmentalized casing having three shoulders, a light transmitting cover at one end of said casing, a closure cap at the other end of said casing, means cooperating with the first of said shoulders to define along with the cover the first of said compartments, being a light projecting assembly compartment, the second of said shoulders cooperating with one end of said battery to define along with said means the second of said compartments, being a battery compartment, and the third of said shoulders cooperating with said cap to define along with the shoulder cooperating end of said battery the third of said compartments, being a current input assembly compartment, said three compartments being contained within said casing to form a unitary and compact flashlight.

MOISES MALKI.
BORIS MATZKIN.
ARON LUIS GOLDMAN.

REFERENCES CITED

The following references are of record in the file of this patent:

UNITED STATES PATENTS

| Number | Name | Date |
|---|---|---|
| 1,145,586 | Herold | July 6, 1915 |
| 1,506,302 | Hopkins | Aug. 26, 1924 |
| 1,506,303 | Hopkins | Aug. 26, 1924 |
| 2,226,353 | Wood | Dec. 24, 1940 |
| 2,293,284 | Emanuel | Aug. 18, 1942 |
| 2,410,527 | Schinske | Nov. 5, 1946 |

FOREIGN PATENTS

| Number | Country | Date |
|---|---|---|
| 357,974 | Great Britain | Sept. 28, 1931 |